*INVENTOR.*
JAMES D. HOFFMAN
BY
*William R. Lane*
ATTORNEY

Feb. 21, 1956 J. D. HOFFMAN 2,735,635
FIRE PREVENTION ARRANGEMENT
Filed Oct. 15, 1952 2 Sheets-Sheet 2

INVENTOR.
JAMES D. HOFFMAN
BY
William L. Lane
ATTORNEY

United States Patent Office 2,735,635
Patented Feb. 21, 1956

2,735,635

FIRE PREVENTION ARRANGEMENT

James D. Hoffman, Pacific Palisades, Calif., assignor to North American Aviation, Inc.

Application October 15, 1952, Serial No. 314,891

3 Claims. (Cl. 244—135)

This invention pertains to an arrangement for the prevention of fires and more particularly to prevent fires around tanks containing inflammable material after having been penetrated by a projectile.

It is necessary in many instances, particularly for aircraft, to provide some means of preventing fires around tanks of inflammable liquid, which are normally fuel tanks containing gasoline or one of various jet engine fuels. There have been many proposed systems of accomplishing fire prevention, none of which has actually worked satisfactorily where space within the aircraft is critical. Some proposals contemplate purging the area around the fuel tank by flooding it with a noncombustible atmosphere. For example, exhaust gas from aircraft engines may be pumped around the fuel tanks. It has been found that this does not provide effective fire prevention because an excessively large volume of this gas is required to prevent fires started by an incendiary projectile. It has been found that a layer of such gas several inches thick must be provided to have any success at all in fire prevention. This means that the fuel tank volume must be decreased to leave enough volume for the exhaust gases. That alone makes such installations undesirable because space requirements in modern aircraft prohibit using such areas for anything but fuel storage. Furthermore, exhaust gases must be dried before such use which necessitates carrying bulky, heavy drying equipment. Also, such gases carry corrosive elements which may damage the aircraft structure. It has additionally been difficult to obtain an area around the tanks sufficiently gas-tight to prevent leakage of air into the space around the tank and to prevent leakage of the inert gas out of this space. As a result the gas loses its effectiveness as it becomes diluted with air. For jet propelled aircraft the engine exhaust gas will not be sufficiently inert for use as a fire preventative so that a gas generator must be carried to supply the gas to be used. This extra equipment becomes heavy, bulky and complicated, and the same problems result as when engine exhaust gas is utilized. Other schemes which involve the use of an inert gas other than exhaust gas are no more desirable because they necessitate carrying extra storage tanks in the aircraft to contain a gas to be conducted around the fuel tanks, which again penalizes the aircraft in both space and weight. Nitrogen storage bottles alone weigh eleven pounds for each pound of nitrogen stored.

Therefore, it is an object of this invention to provide an effective fire prevention arrangement for tanks containing inflammable material.

Another object of this invention is to provide a fire prevention arrangement that is compact and will not reduce storage capacity of a tank.

An additional object of this invention is to provide a fire prevention arrangement that is light in weight, consistent in its results, and simple to fabricate and install.

Still another object of this invention is to provide a fire prevention arrangement which will not affect structural elements by load or corrosion.

A further object of this invention is to provide a fire prevention arrangement which eliminates the necessity for exhaust gas generators or for gas storage bottles.

Yet another object of this invention is to provide a fire prevention arrangement whereby combustion resistant gas is retained under pressure and extinguishes fires by its dynamic effect when released.

A still further object of this invention is to provide a fire prevention arrangement which can be utilized to purge internal spaces in fuel tanks as well as the space around fuel tanks.

These and other objects will become apparent from the following detailed description taken in connection with the accompanying drawings in which.

Figure 3:
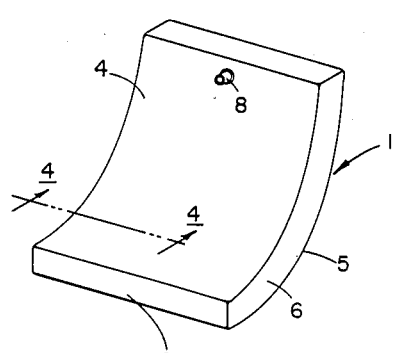
Fig. 3 is a perspective view of an individual gas container.
Figure 4:
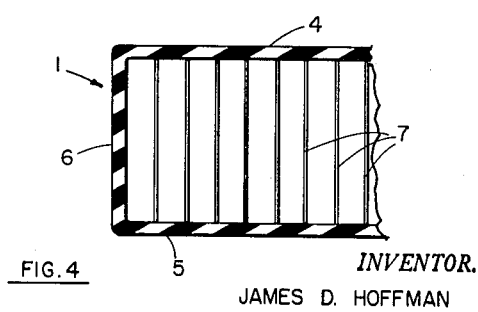
Fig. 4 is a sectional view taken along line 4—4 of Fig. 3.

The fire preventive arrangement of this invention is comprised of a plurality of individual containers 1 which are designed to fit within a structure such as an aircraft fuselage or wing 2. These containers may be disposed adjacent the exterior of a tank or bulkhead 3 which contains a combustible liquid such as gasoline. As shown in Figs. 3 and 4 the individual containers may be formed to a predetermined contour and include principal surfaces 4 and 5 and closed sides 6. These containers are of gastight, flexible construction and may be of a rubber product such as a rubber impregnated fabric. The containers are not only formed to a predetermined contour but are shape-retaining so that they cannot be distended beyond this contour. The shape-retaining characteristic may be obtained as shown in Fig. 4 by providing a plurality of tension-assuming members such as threads 7 which are bonded or otherwise suitably attached at their opposite ends to principal surfaces 4 and 5 and extend between these surfaces. Thus if a gas is admitted to the interior of a container 1 the flexible construction thereof will permit inflation of the container only to the predetermined contour such as that illustrated in Fig. 3 beyond which threads 7 will prohibit any movement. Pressurization may be obtained in any suitable manner and may be controlled by a valve 8 arranged to allow a gas to enter but will prohibit a gas from leaving the container. Such a valve may be the type utilized on any ordinary tire inner tube which is well-known in the art.

Figure 1:
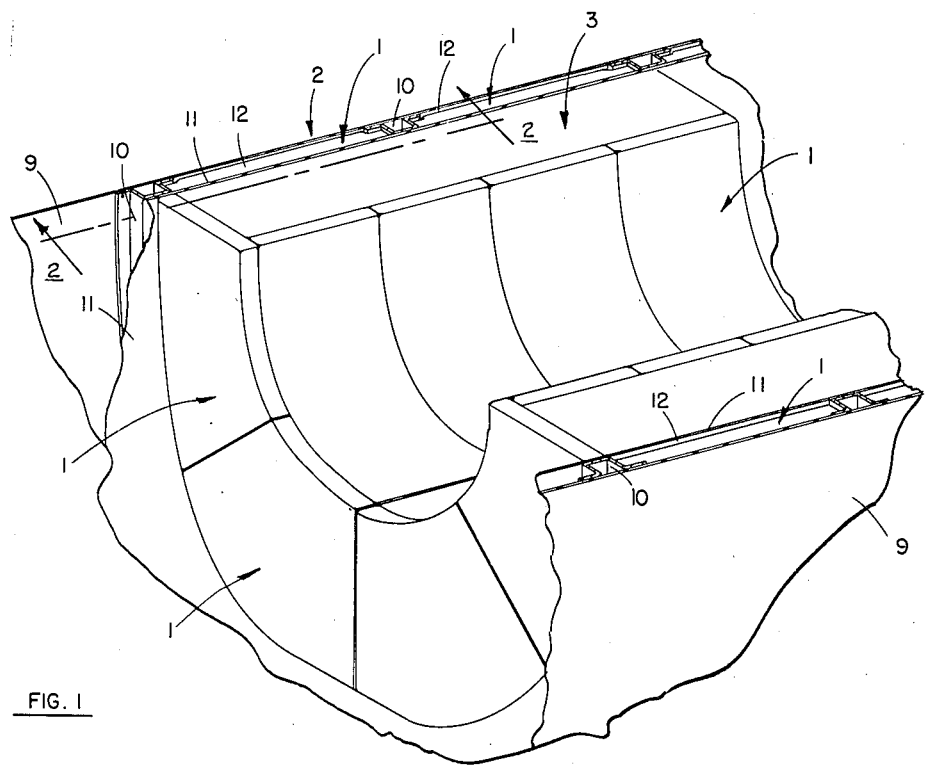
Fig. 1 is a perspective view of the fire prevention arrangement of this invention as applied to a fuel tank.
Figure 2:
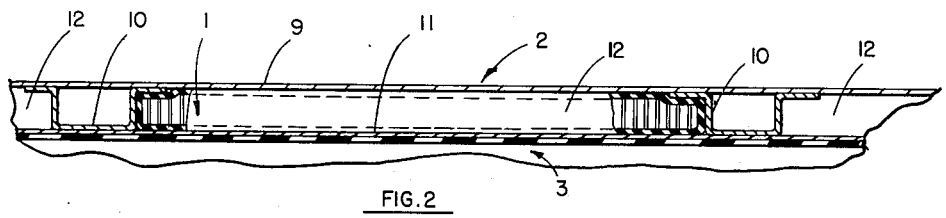
Fig. 2 is a sectional view taken on line 2—2 of Fig. 1.

Figs. 1 and 2 illustrate a typical installation of the containers of this invention. The aircraft structure may include an exterior skin 9 which is attached to supporting member or beam 10 and has a curved contour corresponding to the desired aerodynamic shape of the airplane. The fuel tank is contained within the aircraft skin and structure, normally being supported on a liner board 11 disposed between the tank and the structural members 10. This liner board serves to assume and distribute the loads exerted by fuel in the tank, preventing distortion of the fuel tank and preventing the fuel tank from exerting any direct loads on the aircraft skin. Thus in effect the liner boards serve as the exterior barrier surface of the fuel tank assembly although they are normally not integral with the sides of the tank. These liner boards may be of sheet metal or plastic construction. The fuel tank and liner boards will normally be contoured so that they fit within the aircraft structure as closely spaced as possible to the aircraft skin so that the maximum fuel storage volume may be utilized. This leaves a space 12 between the fuel tank and liner board, and the aircraft skin which is, in the usual design, a wasted space.

By the provisions of this invention the normally unused space 12 can be made to contain elements which will effectively prevent combustion of the fuel. Containers 1 are formed to a contour such that when they are inflated to their maximum predetermined size they will exactly fit within space 12. Thus, for example, there may be one contoured container disposed between the two structural members 10 and between the liner board and the skin, being exactly conterminous with this space. The containers may be made in various sizes and shapes as required by the particular installation. As illustrated, additional containers are provided on the end of the tank and still other containers fit on the inner curved surface of the tank. In many installations there will be further structural elements closely associated with this inner surface of the tank but which are not shown here for the purposes of clarity. When these structural elements are provided it is of course contemplated that containers 1 will fit between the tank and these elements. These containers may be made in any desired irregular contour so as to accommodate the various structural members which may be encountered.

The flexibility of these containers when uninflated enables them to be easily installed in the narrow spaces around the fuel tank. Of course if the fuel tank is removed it may be possible to install these containers in their inflated condition. When disposed in the aircraft adjacent the fuel tank and ready for use these containers will be charged with an incombustible inert gas such as nitrogen. This will assure that the containers are extended to their predetermined contour but they will not inflate beyond this point, as described above, because of internal threads 7. The gas should be at a pressure greater than atmospheric when in the containers and it has been found that 10 p. s. i. gage at sea level is a satisfactory pressure for many requirements with a one and one half inch thick container. The pressure requirements may vary and if the pressure is higher the container can be even thinner.

As the aircraft flies to an altitude the differential between the pressure within the containers and the ambient atmospheric pressure will naturally increase. Despite the initial pressure within the containers and the additional pressure differential between the container pressure and ambient pressure the containers will nevertheless retain their predetermined contour. Internal threads 7 prevent expansion and therefore maintain the containers at the predetermined contour. This is very important because it assures that at no time will these containers impose a load on the aircraft structure or the fuel tank on account of their internal pressure. This means that the aircraft structure need be made no stronger or heavier when these containers are installed than is the case without the containers, being loaded only by the containers and the gas.

Figure 5:
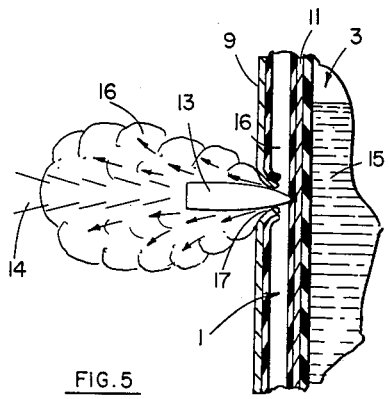
Figs. 5, 6 and 7 are sectional views progressively illustrating the fire preventive action of this invention.
Figure 6:
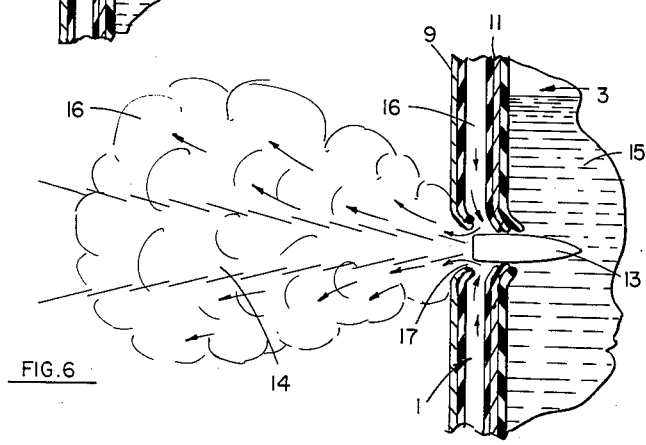
Figure 7:
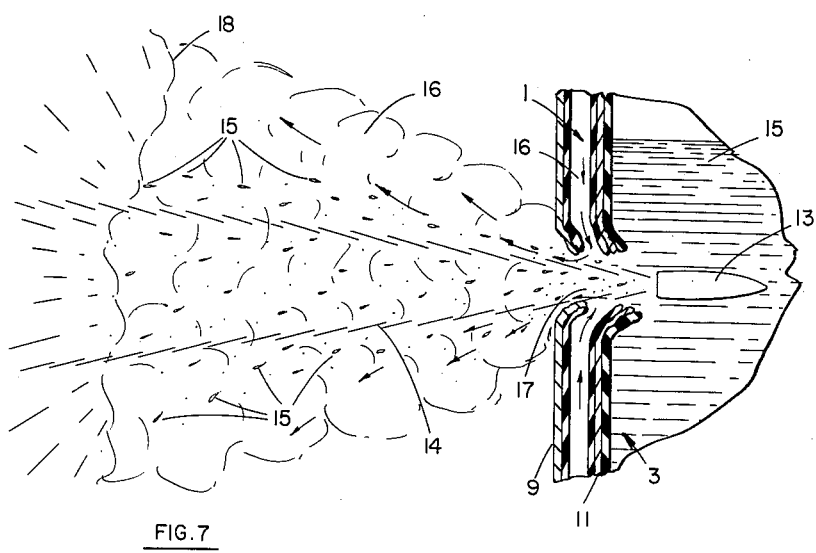

The fire preventing action of these inert gas containers is illustrated in Figs. 5, 6, and 7. These figures show an incendiary bullet 13 approaching, piercing and entering the fuel cell. Such a projectile generates a trail of burning material 14 behind it which will ignite an inflammable fluid such as aviation gasoline 15. Normally when such a bullet enters a fuel tank the fire trail of the projectile will cause the start of a disastrous, rapidly progressive fire. By the provisions of this invention, however, such an occurrence is prevented.

As shown in Fig. 5 the projectile has pierced the skin of the aircraft and has just punctured a container 1. The instant this occurs the pressurized gas 16 from within the container will begin to escape through opening 17 and will surround the projectile. In Fig. 6 the projectile has penetrated the fuel tank. By this time additional gas 16 has escaped from the container and blankets a considerable portion of fire trail 14 with a noncombustible atmosphere. When the rapidly traveling projectile enters the tank and contacts the fuel, which is relatively incompressible, a tremendous shock wave is engendered which travels across the fuel tank ahead of the projectile. The shock wave in the fuel will contact the opposite wall of the tank and rebound in the direction of the opening through which the projectile has entered. In Fig. 7 the projectile is shown entirely within the tank, having left opening 17 entirely unobstructed. The shock wave, which may develop pressures in excess of 2,000 p. s. i., causes some of the fuel to be violently driven through this opening and droplets of fuel may be hurled a considerable distance beyond the tank. Although inert gas 16 has progressed even further outwardly along the path of incendiary trail 14 by the time the fuel is thus ejected, a few drops of fuel may be thrown even beyond this advancing noncombustible atmosphere. This fuel may in some instances be ignited by the incendiary trail of the bullet causing a flame front 18 to be started. However, the inert gas emerges from the container with such rapidity that its velocity exceeds the rate at which a flame can be propagated in the fuel which has been thrown the farthest from the tank. Because of this the advancing cloud of inert gas, traveling at a higher velocity than that of flame-front 18, will provide a snuffing action which will actually blow out the flame and prevent its approaching the aircraft or causing any damage whatsoever. In this manner the dynamic effect of the released gas is utilized to blow out any flame rather than relying merely on a stationary blanket of inert gas and a much more effective fire preventive action results. Gas from within a container will continue to pour forth and supply an inert noncombustible atmosphere for a period of time sufficient to prevent any combustion from the incendiary trail of the projectile as larger quantities of fuel pour through opening 17. By the time the gas supply is exhausted the incendiary trail will have burned out and danger of fire will be past.

If an aircraft provided with containers such as described above were to sustain a hit from a second projectile the second hit would in all probability be at a location remote from the first hit. In most cases with modern high speed aircraft very few hits are sustained so that there is little likelihood of two projectiles passing through any one of the containers. After a second hit a second container would be punctured by the second projectile and inert gas would be discharged from the second container for preventing a fire in the same manner as did the first container. Each container by being permanently charged with an inert gas retains full fire preventive potentialities regardless of the deflation of one of the other containers.

The same fire prevention action will result for other type projectile damage. For example, a bullet may travel entirely through a fuel tank coming out on the opposite side. When the projectile escapes from the fuel tank it may possibly drag a certain amount of fuel along with it. A bullet passing entirely through a tank in this manner will release the pressurized inert gas from the container punctured upon its entry, which will act to prevent fires as described above, and in addition will pass through one of the containers on the opposite side causing the gas to likewise escape from that container. The gas from the latter container will follow the path of the bullet as it emerges from the tank and will, by its dynamic effect, provide an advancing noncombustible atmosphere along this path and will blow out any flame which has been propagated. Similarly, if a bullet should penetrate above the fuel level or pass out of the tank above the fuel level the pressurized gas from the containers punctured will travel along the path of the projectile and prevent fires from occurring in the fuel vapor which is thereby released.

When the aircraft returns after sustaining a hit it is a simple matter when repairing the fuel tank and airplane structure to either patch the container that was broken by the projectile or supply a new container for the one previously damaged. The patched or new container can be charged with an inert gas so that the container is ready for fire prevention action on the next flight of the aircraft. Repair or replacement of a single damaged container is therefore a simple, quick and economical proposition.

Figure 8:
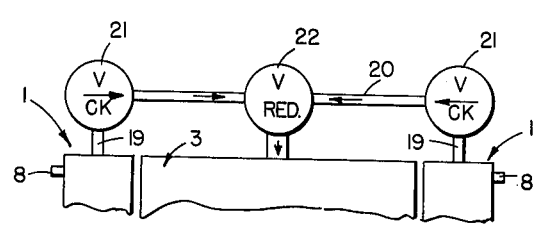
Fig. 8 is a fragmentary view of a modification of this invention.

By the modification illustrated in Fig. 8, the gas from the containers may be used to purge the interior of the fuel tank as when the fuel is exhausted therefrom. It is highly desirable to provide a noncombustible atmosphere above fuel in a tank as the fuel is removed because this space may otherwise contain a highly combustible combination of vaporized fuel and air. This is accomplished in many instances by carrying additional nitrogen bottles in the aircraft from which the nitrogen is conducted to the top of the fuel tank. By the modification of Fig. 8 no such additional equipment is required. Here containers 1 act as containers for the inert gas to purge the space above the fuel in the tank and also act in their normal fire preventive manner for protecting the exterior portions of the fuel tank. The containers for this modification will be charged with a pressurized inert gas in the usual manner but a higher pressure within the containers may be required. Leading from some or all of the containers will be outlets 19 which connect with a manifold 20. The manifold 20 is in turn connected with the top of the fuel tank. A check valve 21 is provided in outlet 19 and a pressure-reducing valve 22 is provided in the manifold. Thus gas at high pressure may pass from each container through the valves and into the top of the fuel tank as the fuel leaves the tank. Reducing valve 22 prevents the imposition of a high pressure on the interior surface of the fuel tank, while allowing gas to enter so as to completely fill the space above the fuel. Check valves 21 prevent all the gas from passing out of the containers should a single one of the containers be punctured by a projectile. The gas within the containers 1 will of course occupy only a small volume while in a pressurized condition, but upon expansion into the interior of fuel tank the gas will entirely fill the volume thereof while still leaving sufficient pressurized gas within each container to provide the fire preventive action.

Of course, there may be variations in construction which differ from that of the preferred embodiment illustrated without departing from the scope of this invention. For example, there may be a direct attachment between the containers and the surface of the fuel tank instead of being a mere contact between these two elements as in the case of the preferred embodiment. Furthermore, it is not necessary that the gas containers actually contact the skin of the airplane as shown in the preferred embodiment in order that the fire preventive effects of this invention be realized, although the arrangement of the preferred embodiment provides the most efficient known utilization of the space within the aircraft. For any of these variations the pressurized gas within the shape-retaining containers will escape when the container is punctured by a projectile, and the discharging inert gas will provide a noncombustible atmosphere and will blow out any flame which has occurred.

It is thus apparent that by the provisions of this invention I have provided an effective fire prevention arrangement wherein gas occupying only a small area may be used to prevent fires which would otherwise result from an incendiary projectile entering a fuel tank. Due to the pressurized characteristics of the gas within the containers a large quantity of gas may be carried therein for providing considerable volume of localized, advancing, noncombustible atmosphere by the dynamic effect of the gas when released. The containers, by being inflatable to a predetermined contour and shape, impose no loads on the fuel tank or the aircraft structure other than the small weight of the containers and the gas therein. By being individually and permanently chargeable with the inert gas the leakage problem encountered by other purging arrangements disappears, additional equipment need not be carried in the aircraft and the various containers will retain complete fire preventive characteristics despite loss of gas from any of the other containers.

It is, of course, obvious that the fire prevention arrangement of this invention could be used with equal success with the fuel tanks of any vehicle other than an aircraft, or could successfully prevent fires around stationary tanks of inflammable material.

The foregoing detailed description is given by way of illustration only, the spirit and scope of this invention being limited only by the appended claims.

I claim:

1. In an aircraft having a fuel tank assembly a fire prevention arrangement comprising a plurality of containers having exterior walls adjacent portions of the surface of said tank assembly, said containers being closely associated one with the other so as to substantially blanket said portions of said tank assembly; means disposed adjacent wall portions of said containers opposite said firstly mentioned walls for holding said containers so positioned; an inert pressurized gas in said containers, each of said containers having a plurality of flexible inelastic thread elements of a predetermined length interconnecting said walls for limiting movement of said walls away from each other by said pressurized gas, said thread elements collectively permitting such movement of said walls to a contour substantially complementary to said tank assembly surface portions and said means for holding said containers adjacent said tank assembly, whereby said tank assembly and said means for holding said containers are free of loads from said pressurized gas; and valve means connected with each of said containers for retaining said gas therein.

2. In combination with an aircraft a fire resistant fuel retaining arrangement comprising tank assembly means disposed in said aircraft in a generally spaced relationship with skin portions of said aircraft; a plurality of containers disposed between said tank assembly means and said aircraft portions; valve means associated with each of said containers for permitting said containers to be individually charged with a pressurized inert gas, each of said containers having flexible wall portions adjacent said tank assembly means and opposite wall portions adjacent said portions of said aircraft, each container being provided with a plurality of flexible inelastic elements of predetermined length interconnecting said wall portions for permitting said pressurized gas to extend said containers only to a contour defined by said inelastic elements, said inelastic elements being dimensioned to permit extension of said walls such that said walls are substantially conterminous with said space so that said tank assembly means and said portions of said aircraft are free from loads imposed by said pressurized gas, and so that a projectile entering said tank assembly means is caused to first pass through one of said containers thereby to release the pressurized gas therefrom to discharge along the path of said projectile for providing a noncombustible atmosphere along said path and extinguishing fuel fires caused by said projectile.

3. A fire prevention arrangement for a bulkhead adapted to retain inflammable material, said arrangement comprising a plurality of containers; means maintaining said containers in a position where they are closely associated with the exterior surface of such a bulkhead; and a combustion resistant gas in said containers, said gas being at a pressure greater than ambient pressure, each of said containers having opposite flexible wall elements and being provided with inelastic means of predetermined length interconnecting said wall elements for permitting said wall elements to be extended away from each other by said pressurized gas only to a contour defined by the limits of said inelastic means, said inelastic means being dimensioned to define a contour substantially complementary to said bulkhead so that said containers are extended to the contour so defined and said bulkhead is free from loads from the pressure of said gas.

References Cited in the file of this patent

UNITED STATES PATENTS

| | | |
|---|---|---|
| 1,224,678 | Sons | May 1, 1917 |
| 1,666,112 | Wallis | Apr. 17, 1928 |
| 2,200,610 | Weichsel | May 14, 1940 |
| 2,262,722 | Grant, Jr. | Nov. 11, 1941 |
| 2,301,483 | Van Daam | Nov. 10, 1942 |
| 2,382,817 | Reiss | Aug. 14, 1945 |
| 2,404,418 | Walker | July 23, 1946 |
| 2,409,245 | Black | Oct. 15, 1946 |
| 2,623,721 | Harrington | Dec. 30, 1952 |
| 2,653,780 | Peppersack | Sept. 29, 1953 |
| 2,657,884 | Merrill | Nov. 3, 1953 |

FOREIGN PATENTS

| | | |
|---|---|---|
| 230,899 | Great Britain | Mar. 16, 1925 |
| 493,293 | France | Apr. 26, 1919 |
| 528,823 | France | Aug. 25, 1921 |
| 963,199 | France | Dec. 26, 1949 |